(12) United States Patent
Zamir et al.

(10) Patent No.: US 10,091,293 B2
(45) Date of Patent: Oct. 2, 2018

(54) RAPID CLOUD-BASED IMAGE CENTRALIZATION

(71) Applicant: VMware, Inc., Palo Alto, CA (US)

(72) Inventors: Tal Zamir, Haifa (IL); Dan Ilan, Tel Aviv (IL)

(73) Assignee: VMware, Inc., Palo Alto, CA (US)

( * ) Notice: Subject to any disclaimer, the term of this patent is extended or adjusted under 35 U.S.C. 154(b) by 335 days.

(21) Appl. No.: 14/074,528

(22) Filed: Nov. 7, 2013

(65) Prior Publication Data

US 2015/0127768 A1  May 7, 2015

(51) Int. Cl.
*H04L 12/24* (2006.01)
*H04L 29/08* (2006.01)
*G06F 11/14* (2006.01)

(52) U.S. Cl.
CPC ...... *H04L 67/1097* (2013.01); *G06F 11/1464* (2013.01); *H04L 67/06* (2013.01); *H04L 67/1095* (2013.01); *G06F 11/1438* (2013.01); *G06F 11/1461* (2013.01)

(58) Field of Classification Search
CPC ........................................................ G06F 17/30
USPC ........................................ 707/748; 709/215
See application file for complete search history.

(56) References Cited

U.S. PATENT DOCUMENTS

| | | | | |
|---|---|---|---|---|
| 7,409,522 B1 * | 8/2008 | Fair | .......................... | G06F 3/061 707/999.202 |
| 7,676,628 B1 * | 3/2010 | Compton | .............. | G06F 3/0605 711/114 |
| 7,827,349 B1 * | 11/2010 | Fair | ........................ | G06F 3/0611 711/112 |
| 8,639,665 B2 * | 1/2014 | Berman | .............. | G06F 11/1469 707/651 |
| 8,832,026 B1 * | 9/2014 | Kazar | ............... | G06F 17/30088 707/634 |
| 8,924,352 B1 | 12/2014 | Andruss et al. | | |
| 9,152,638 B1 * | 10/2015 | Naftel | ................. | G06F 11/1451 |
| 2003/0158862 A1 * | 8/2003 | Eshel | ................ | G06F 17/30067 |
| 2008/0208929 A1 * | 8/2008 | Phillipi | ................ | G06F 11/1451 |
| 2010/0077165 A1 * | 3/2010 | Lu | ........................ | G06F 11/1451 711/162 |
| 2010/0088392 A1 * | 4/2010 | Kuhl | ................... | H04L 67/1097 709/217 |
| 2012/0310894 A1 * | 12/2012 | Freedman | ........... | G06F 11/1402 707/674 |

(Continued)

*Primary Examiner* — Moustafa M Meky
*Assistant Examiner* — Elizabeth Kassa
(74) *Attorney, Agent, or Firm* — Fish & Richardson P.C.

(57) ABSTRACT

A system for a mass centralization approach to full image cloning of multiple computing devices is provided. The system includes a server, and a computing device that includes a disk for data storage, wherein the disk includes a plurality of blocks within a plurality of regions. The system also includes a processor programmed to map each file stored on the disk to at least one of the plurality of blocks, for one or more of the plurality of regions of the disk, determine that a number of files appearing in sequential blocks exceeds a predefined threshold number of files, perform a continuous scan of the one or more of the plurality of regions of the disk occupied by the number of files appearing in sequential blocks exceeding the predefined threshold number of files, and send a copy of the files scanned from the one or more plurality of regions of the disk to the server.

21 Claims, 3 Drawing Sheets

(56) References Cited

U.S. PATENT DOCUMENTS

| | | | |
|---|---|---|---|
| 2013/0268493 A1* | 10/2013 | Berman | G06F 11/1469 |
| | | | 707/649 |
| 2013/0332688 A1* | 12/2013 | Corbett | G06F 17/30088 |
| | | | 711/162 |
| 2014/0013046 A1* | 1/2014 | Corbett | G06F 12/00 |
| | | | 711/112 |
| 2014/0052906 A1 | 2/2014 | Thyagarajan | |
| 2014/0156866 A1* | 6/2014 | Kallstrom | H04L 67/06 |
| | | | 709/232 |
| 2014/0188807 A1* | 7/2014 | Al-Kiswany | G06F 11/1464 |
| | | | 707/652 |
| 2015/0127661 A1 | 5/2015 | Zamir et al. | |

* cited by examiner

RAPID CLOUD-BASED IMAGE CENTRALIZATION

BACKGROUND

The process of cloning computer images into a central location creates a full copy of an image of a computing device and uploads the copy of the image to a central server in order to provide various services, such as full image backup, disaster recovery, and physical to virtual (P2V) migration projects. Therefore, centralization is likely the first step in an operating system (OS), hardware, P2V, and/or virtual desktop infrastructure (VDI) migration project, since a full clone of each computing device is made prior to starting the migration. As a full system backup solution, it benefits end users who can access their centralized data and applications from any device, as well as restore a full system image.

However, full cloning of computer images into a central location is a challenging task in many current Information Technology (IT) operations. One reason is the complexity of managing a large number of different desktop images that may exist on a set of computing devices. Another reason that makes full cloning of computer images into a central location a challenging task is that many large enterprises are dispersed over multiple geographic locations. The use of Local Area Networks (LANs) that are connected over one or more Wide Area Networks (WANs) with variable bandwidths and latencies is a serious barrier to providing efficient cloning of computer images without sacrificing the end user experience. Further, centralization is often applied on a large number of computing devices, which poses significant performance and scalability challenges. In particular, traditional systems require a significant amount of time, disk, network and central processing unit (CPU) resources to complete a "day zero" centralization, with much of the time is wasted on scanning and uploading files from each computing device. This bottleneck makes it hard for IT to complete migration projects on time and provides inferior service to users during the centralization process.

Traditional disk cloning creates a full clone of an image of an offline or online computing device and stores it on locally-attached storage or a LAN network share. However, these solutions are not designed for efficient mass centralization, especially when the computing devices are partially connected over WAN links (e.g. across multiple branches). In addition, full image cloning software usually uses the file-system interfaces to enumerate all files in arbitrary order, read their entire content, and store the files on local or remote storage devices. Further, while a common optimization technique in image cloning is to skip files whose content is identical to files in the central store, based on their data checksum (e.g. MD5), this requires reading the entire content of files before cloning them, reducing network traffic for the price of additional scanning of those files.

SUMMARY

Systems and methods described herein provide a mass centralization approach to full image cloning of multiple computing devices. The system includes a server, and a computing device that includes a disk for data storage, wherein the disk includes a plurality of blocks within a plurality of regions. The system also includes a processor programmed to map each file stored on the disk to at least one of the plurality of blocks, for one or more of the plurality of regions of the disk, determine that a number of files appearing in sequential blocks exceeds a predefined threshold number of files, perform a continuous scan of the one or more of the plurality of regions of the disk occupied by the number of files appearing in sequential blocks exceeding the predefined threshold number of files, and send a copy of the files scanned from the one or more plurality of regions of the disk to the server.

DETAILED DESCRIPTION

Embodiments of the present disclosure provide a mass centralization approach to full image cloning of multiple computing devices. More specifically, embodiments of the present disclosure enable metadata from computing devices to be used to compute an optimal centralization plan that rapidly clones the most important assets from the fastest available computing devices, with minimal user interruption before cloning the rest of the system, while also taking advantage of a type of physical disk available. Combining these techniques enables the entire cloning process to be completed in a fraction of the time needed by other systems.

In accordance with embodiments of the present disclosure, the term "computing device" refers to a computer system that is operable to execute an operating system (OS) and software applications, and to store user data. Examples of computing devices include, but are not limited to, desktop computers, laptop computers, netbook computers, tablets, and wireless mobile devices such as smart phones. A computing device can be represented by a virtual machine which executes an OS and applications just like any other hardware, except that the hardware is emulated with software. It is noted that the techniques for cloning computer images into a central location described herein are not limited to being implemented for any particular type of computing device. Rather, the techniques described herein may be implemented for any computing device that is operable to execute an OS and software applications and to store user data.

In accordance with embodiments of the present disclosure, a desktop image includes a collection of files that store data in compressed or non-compressed form, and the data may be unformatted (e.g., binary data, raw disk blocks, raw data partitions, etc.) or structured as various types of files (e.g., data files, dynamic link library (DLL) files, executable files, personal user files of various file types, various types of configuration files, and the like) and/or any other type of data structure format.

As used herein, "uploading" a desktop image refers to transferring or otherwise transmitting desktop image files in a particular sequence over one or more networks to a central server. In accordance with embodiments of the present disclosure, the order in which the files in a desktop image are uploaded to the central server is determined based on file metadata from a plurality of computing devices.

Figure 1:
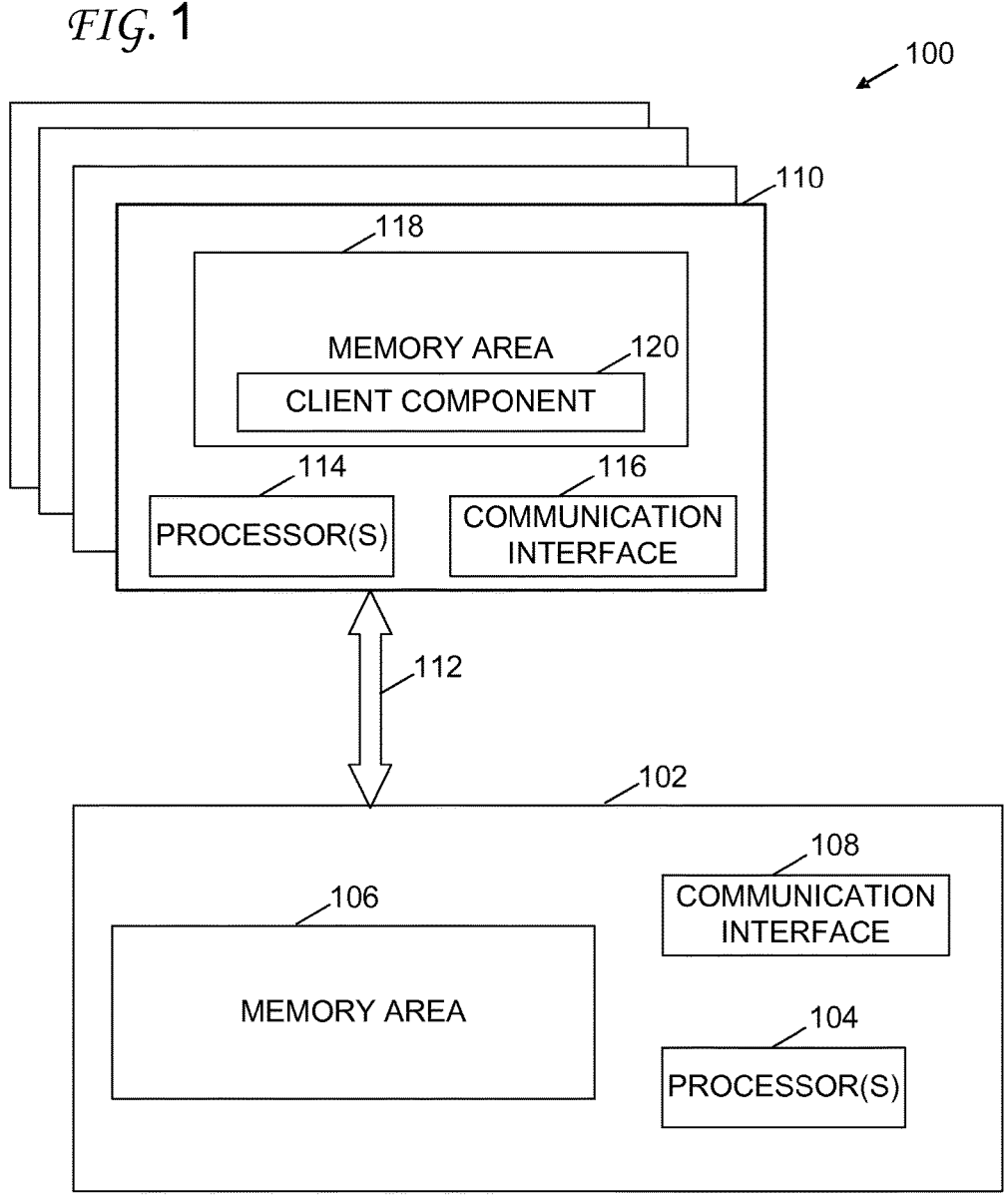
FIG. 1 is a block diagram of an exemplary system architecture in accordance with embodiments of the present disclosure.
Figure 2:
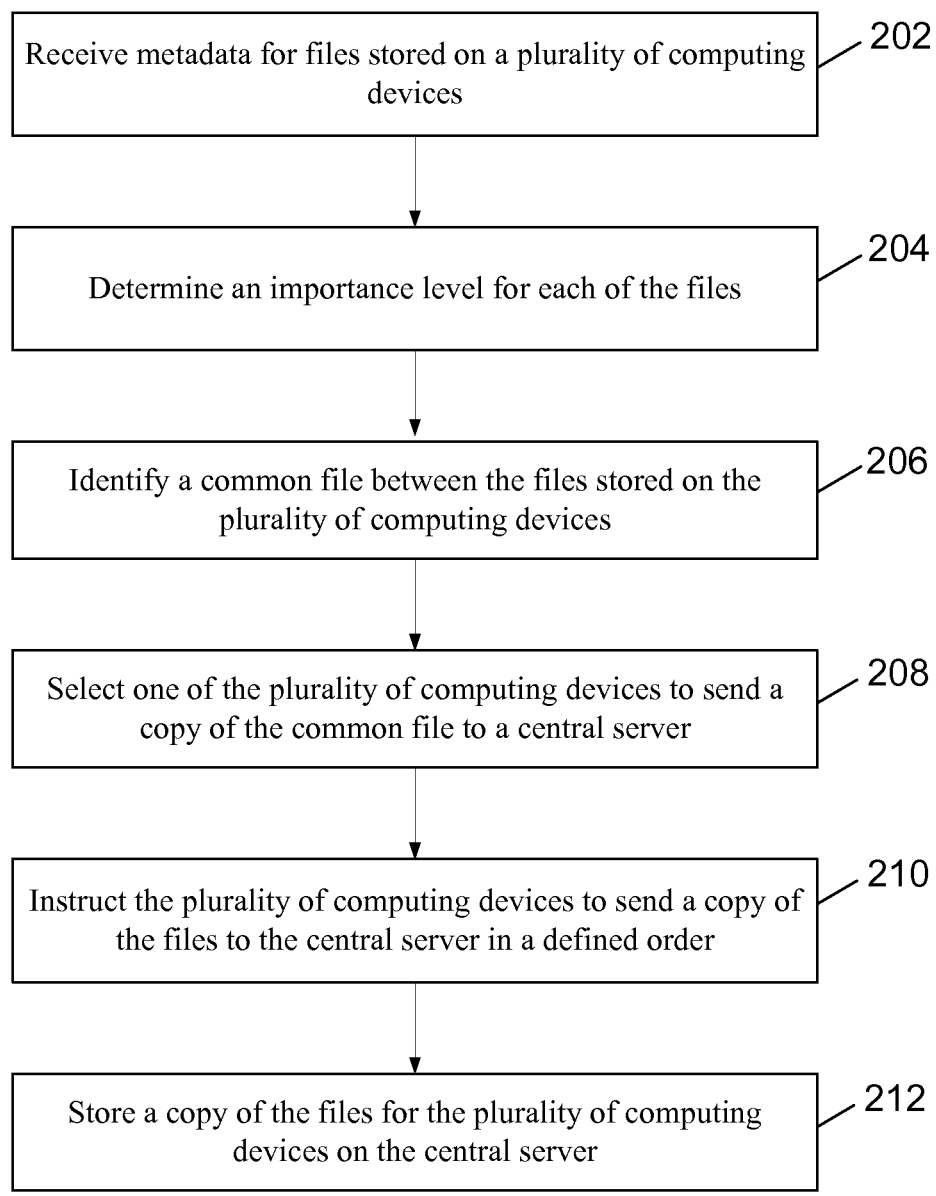
FIG. 2 is a flow diagram of an exemplary method for cloning computer images into a central location.
Figure 3:
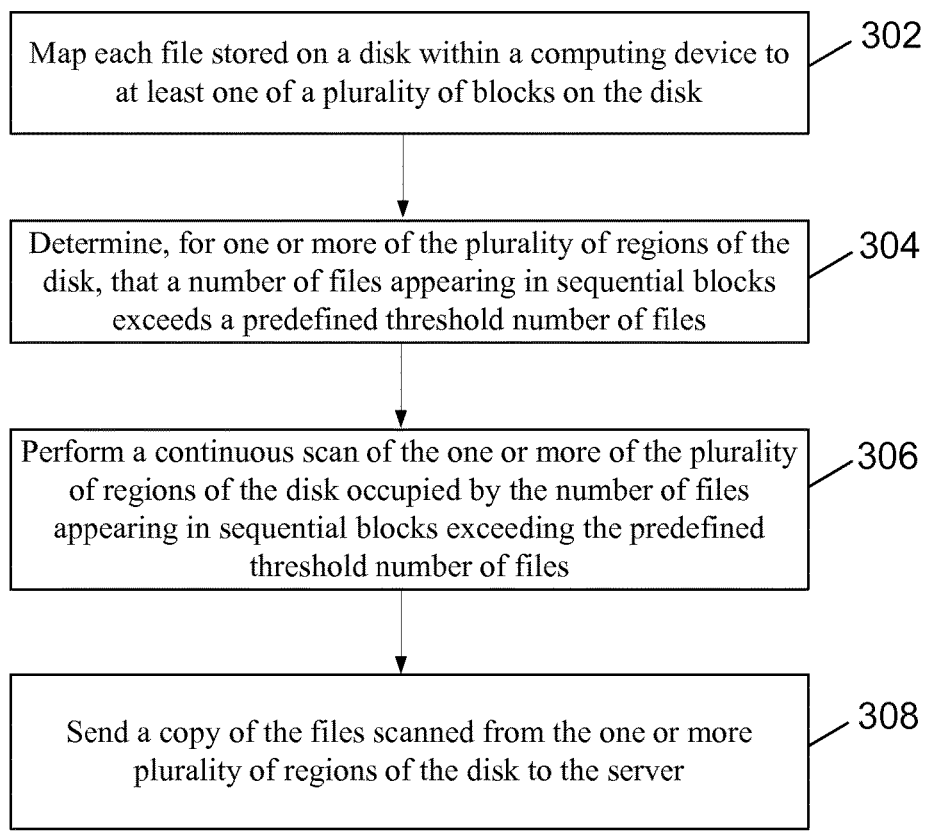
FIG. 3 is a flow diagram of another exemplary method for cloning of computer images into a central location.

With reference now to FIG. 1, a block diagram of an exemplary system 100 is provided. System 100 is but one example of a suitable system and is not intended to suggest any limitation as to the scope of use or functionality of the present disclosure. Further, system 200 should not be interpreted as having any dependency or requirement relating to any one or combination of components illustrated herein. Central server 102 includes a processor 104, a memory area 106, and communication interface 108. In embodiments, processor 104 is transformed into a special purpose processor by executing computer-executable instructions or by otherwise being programmed. For example, processor 104 is programmed with instructions such as illustrated in FIG. 2 and FIG. 3.

Memory area 106 may be any device allowing information, such as executable instructions, suitability values, configuration options (e.g., predetermined durations for receiving transmissions), and/or other data, to be stored and retrieved. For example, memory area 106 may include one or more random access memory (RAM) modules, flash memory modules, hard disks, solid state disks, and/or optical disks. In some embodiments, executable instructions for performing one or more of the operations described herein, for example, the operations shown in FIG. 2 and FIG. 3 are stored in memory area 106. In one embodiment, memory area 106 includes one or more computer-readable storage media that have computer-executable components embodied thereon.

Communication interface 108 enables central server 102 to communicate with a remote device (e.g., computing devices 110) via network 112, such as a local area network (LAN), a wide area network (WAN), or a combination thereof. Computing devices 110 include a processor 114, communication interface 116, and a memory area 118 that includes client component 120. While client component 120 is shown to be stored in memory area 118, client component 120 may be stored and executed from a memory area remote from computing devices 110. For example, client component 120 may be stored in a cloud service, a database, or other memory area accessible by computing devices 110. Such embodiments reduce the computational and storage burden on computing devices 110.

In one embodiment, client component 120 performs a metadata scan of the local file system by enumerating all files. The result of this light scan is a listing of all files with their paths, sizes, and timestamps. Additionally, during the scan, performance counters are collected to estimate a maximal and average disk read throughput (along with the disk vendor and model), network bandwidth, and central processing unit (CPU) usage. During this process, a user can keep working on computing device 110 throughout and after the metadata scan is performed, as it is being performed on a static snapshot, for example, a Volume Shadow Copy Service (VSS) snapshot taken by client component 120. In one embodiment, file modifications performed by the user after the VSS snapshot will be detected and handled in subsequent incremental upload operations. A similar scan may also be performed on common network shares (once per unique network share), which can be automatically detected on computing devices 110 and are scanned directly from central server 102 using provided credentials. As a result, central server 102 has a listing of file metadata from all computing devices 110 and network shares in the organization, along with statistical data about resource performance on each computing device 110.

Central server 102 may divide the work of uploading files amongst the available computing devices 110 in a prioritized manner based on the received file metadata. For example, a file which is available in multiple computing devices 110 may be uploaded from a computing device 110 which has a combination of fast disk read speed, high network bandwidth, and low user activity. Common files that are also available in a network file share which is "close" to central server 110 are quickly uploaded from the network share.

In one embodiment, central server 102 prioritizes the list of files among the computing devices 110 according to an estimated importance of each file. This prioritization is done by grading each file according to several parameters. One of the parameters may be file location, such as standard user data folders (e.g. "Documents", and "Pictures"), potential user data folders (e.g., folders directly under the root directory, which are not pre-defined OS/system folders and are not mapped by MSI as an application's installation location), per-user application data (e.g. the user's "ProgramData" folder), global application data (e.g. the global "ProgramData" folder), application binary folders (the "Program Files" folders), and operating system folders.

Other possible parameters may be file type/extension (preferring document-related extensions over binary and application extensions), worldwide file uniqueness (preferring files whose meta-information checksum had not been seen before in any other organization), and file usage timestamps (preferring recently modified/created/accessed files over stale files). For each file, a grade of, for example, [0 . . . 1] is provided for each parameter. As such, a final grade of a file is a weighted normalization of all parameters considered.

As a result of prioritizing files, files which seem to be important assets (e.g. unique user documents) are to be uploaded before less important/widely available files (e.g. DLL files). In one embodiment, to keep central server 102 scalable, some of the planning/prioritizing is distributed to respective computing devices 110. For example, ranking the files by their importance can be completed at each computing device 110 instead of centrally, in central server 102.

Once central server 102 creates a prioritized list of files to upload from each computing device 110, computing devices 110 can start the upload phase. However, to avoid a case where the fastest computing device 110 is responsible for uploading most or all duplicate/common files (leading to exaggerated load on the particular computing device), central server 102 distributes the upload workload across all available computing devices 110 in a ratio which is proportional to a rank of computing devices 110. In one embodiment, a rank is calculated based on an estimated disk read speed, network bandwidth, and user activity of each computing device 110 as described in further detail below.

Thus, prior to uploading the files from computing devices 110, central server 102 may also rank computing devices 110 by several factors to decide from which computing device 110 to upload each particular file (e.g., when a file has multiple copies in multiple computing devices 110). Based on the file listing from each computing device 110, an estimation can be made to estimate a particular computing device's 110 overall activity level and a user's active and inactive time frames associated with a particular computing device 110. For example, computing devices 110 that are usually not very active at a time of day on which an upload should commence will get a higher rank in this criterion. Thus, to better distribute file uploads amongst computing devices 110 that include common files, in one embodiment, a determination is made as to which computing device 110 is more likely to be active during a particular upload timeframe. Such active computing devices 110 are assigned less upload work as to not interfere with the user's work or to impact his/her experience. In one embodiment, to determine an overall activity level of computing devices 110, client component 120 can query statistical data that measure the number of reads/writes since computing devices 110 were booted.

To determine a user's active time frames on a particular computing device 110, client component 120 analyzes an amount of modified user data files (e.g. documents) per hour-of-day. For example, for users with a sufficient number of documents, this statistical approach provides a good estimation of the user's active hours. However, since this estimation is done based purely on a scan performed during an information collection phase and does not require long term user tracking, this information can be used immediately to rank computing devices 110.

Another criterion for ranking computing devices 110 is available bandwidth between each computing devices 110 and central server 102. Some computing devices 110 (e.g. in branch offices) may be linked to central server 102 via low bandwidth links and therefore will have a lower rank. To quickly determine the available network bandwidth, the relevant network performance counters may be monitored while a file listing is uploaded to central server 102 during the information collection phase.

In one embodiment, the disk read throughput may also be considered when ranking computing devices 110. To estimate this throughput, the disk performance counters are monitored while the disk scan in the information collection phase is being executed. The maximal and average disk read throughputs are then calculated and sent to central server 102 for ranking computing devices 110. Additionally, based on a model and vendor of a disk and using worldwide statistical data from other deployments, an expected maximal read throughput of a specific disk model can be determined. For example, solid state drive (SSD) disks would have higher rank than a classic hard disk drive (HDD) with rotating discs.

In the above examples, an assumption that a fixed set of computing devices 110 is centralized is made. However, if additional computing devices 110 are added or removed while the centralization process is in motion, the plan is augmented accordingly. For example, if a new computing device 110 is added to a group of computing devices 110 being centralized, central server 102 performs an initial scan of this new computing device 110 and instructs it to upload any files central server 102 has not yet obtained through the other computing devices 110.

During an uploading of files, each computing device 110 begins to upload files that were dictated by central server 102 in an order defined by central server 102. Central server 102 distributes the files amongst computing devices 12 in proportion to their input/output (I/O) activity level. Computing devices 110 which are usually I/O active upload less data and computing devices 110 that are not typically I/O active upload more data. In one embodiment, if user activity is detected while an upload occurs, the applicable computing device 110 slows its activity down to avoid impacting the user experience.

Once a file is uploaded to central server 102, its content may be stored in a "Single Instance Store" (SIS). As a file's data blocks are sent to central server 102, it also incrementally calculates its MD5 data checksum while uploading, which is eventually stored in a SIS along with the file's data.

As mentioned above, to perform an upload, client component 120 first takes a VSS snapshot, to create a point-in-time snapshot of a file system for one or more computing devices 110, which is available via a designated VSS volume. Creating a VSS snapshot is almost instantaneous (usually only requires a few seconds) as it uses lazy copy-on-write mechanisms to create the snapshot. Then, depending on the amount of files to be uploaded, an operation mode is selected. For example, if the number of files to upload is small (e.g., lower than a defined threshold level), client component 120 reads file content by using standard filesystem application programming interfaces (APIs). However, if the number of files to upload is significant (e.g., greater than a defined threshold level), client component 120 creates a mapping of files to the disk blocks containing their data and performs a single sequential direct disk read to read content of contiguous files (if it is estimated to be beneficial), as described in further detail below.

As soon as client component 120 uploads the first files from a computing device 110 to central server 102, the user can immediately enjoy the benefit of accessing his/her files from any mobile device (without waiting for the entire upload to be completed), for example, via a web interface. Once all files of a given computing device 110 have been uploaded to central server 102, for example, an upload in which a subset of a total number of files is uploaded by one computing device 110 and another subset of the total number of files is uploaded by another computing device 110 (e.g., uploading duplicate files), a clone of computing device 110 can be used in central server 102 for various operations, such as: full system restore and migration.

A common optimization technique in image cloning is to skip files whose content is identical to files in the central store, based on their data checksum (e.g. MD5). Conventionally, to determine whether two files are duplicates, data checksums for the two files are compared. However, this method requires the files' data to be fully scanned, which consumes a lot of disk I/O operations. However, embodiments of the present disclosure enable a heuristic way of detecting duplicates by comparing file metadata (e.g., a combination of its filename, file size, and modification time). If two files have the same metadata, this heuristic duplication detection mechanism considers their data to be the same as well. Thus, if there is a wide consensus of a file's metadata, a scan and upload from one computing device 110 in which it exists and is all that may be needed, thus completely skipping uploading and scanning the common file from any other computing devices 110. In embodiments, a common file may be uploaded from more than one computing device 110 but less than all computing devices 110 that include the common file. This enables rapid de-duplication of files across computing devices 110 during initial centralization by practically saving the time of reading all common files in most computing devices 110.

Further, while a probability for two files to have the same metadata but different data to happen by coincidence is negligible, as the resolution of the modification and creation timestamps is relatively high (e.g., milliseconds), it is possible that an application will intentionally change a file's data while preserving its filename, size, and modification time. Very few applications will use this practice to "hide" file data changes (specifically, malware might be using such a technique). Thus, to handle these cases, if central server 102 detects a duplicate file which has N copies, it asks an odd number of computing devices M, to upload the duplicate file (e.g. N=1000, M=3) and the rest (N-M) are exempt from scanning and uploading the duplicate file. Thus, during the upload phase, central server 102 receives M copies of the duplicate file and validates that they are indeed equal by comparing their data. In a rare case in which some copies are different, an alert may be generated and the specific filename or other identifier of the file is added to a black-list, preventing it from being used for consensus-based duplicate detection. However, if only a few copies out of the N suspected copies are different, the sampling technique suggested above might fail to detect them (e.g., if it picks M identical copies, by chance). To handle this scenario, after initial centralization is completed, a low-priority background task can be used to scan the skipped files to make sure that their checksums are as expected. Centralization of computing devices 110 can be completed before this background task has completed running; however, computing devices 110 will stay in a "verification mode" until all files are double-checked by this background task. In one embodiment, to provide an additional safety net, this method can be limited to files of a certain type or to files in certain directories. For example, this method is applied to only system files (e.g. DLL and EXE), which are natural candidates for duplicate elimination.

By eliminating a significant amount of data to scan and upload, centralization time is not only dramatically reduced, but the load on central server 102 is significantly reduced. One of ordinary skill in the art will appreciate that this technique is suitable not only for initial centralization, but also as a technique for future incremental scans/uploads throughout the life of system 100.

Further, while the approach of using file-system APIs to read the contents of files via a VSS snapshot is adequate when reading files in an arbitrary access order, when reading from physical hard disks which are based on rotating discs, creating a full image clone for the first time or cloning a big set of files which are physically subsequent on disk, can be performed in a more efficient manner by performing a single pass on the disk blocks which contain the contiguous files and by assuming that once a file has been placed on disk by the file-system, its location on disk will not change unless a defragmentation operation is invoked. Additionally, while the file isn't modified, it is safe to read its content by reading its disk blocks directly. Therefore, on computing devices 110 which need to upload a large set of files, a hybrid approach that performs a direct disk scan for contiguous files and a regular VSS file scan for the rest may be employed.

To perform the scan, client component 120 first maps each file to its disk blocks by querying New Technology File System (NTFS) or similar mechanism on other file-systems. Client component 120 then checks if there is a large number of files which appear sequentially on disk. These files are optimistically scanned by doing a single pass on the region they occupy in the physical disk, avoiding numerous disk head jumps. This enables the scan to achieve high throughput. However, as computing device 110 is online at the time of the direct scan, a process can monitor which files had been modified and re-scan them using the VSS snapshot if necessary. Further, monitoring added or deleted files is not needed for the purpose of verifying the direct disk scan, as it is assumed that creation or deletion of files does not change the location of existing files on disk. A common scenario for which a direct scan is beneficial is a directory with numerous stale files (e.g., files that had been written once into the disk and are rarely accessed or modified). For example, operating system and application files which had been written early in the life of the disk (while it was not yet heavily fragmented). In this example, the files might indeed be located sequentially on disk and will have a low probability for modification during the scan.

With reference now to FIG. 2, an exemplary flow diagram of an exemplary method for providing a mass centralization approach to full image cloning of multiple computing devices 110 will now be described. Further, while the following method is described with reference to only one of computing devices 110 (e.g., a first computing device), one of ordinary skill in the art will appreciate that the following method may be applied to each of computing devices 110. As shown in FIG. 2, at 202, metadata (e.g., a combination of its filename, size, and modification time) for files stored on a plurality of computing devices (e.g., computing devices 110) is received. At 204, an importance level for each of the files is determined from the metadata. In one embodiment, a level of importance is based on several parameters. One of the parameters may be file location, such as standard user data folders (e.g. "Documents", and "Pictures"), potential user data folders (e.g., folders directly under the root directory, which are not pre-defined OS/system folders and are not mapped by MSI as an application's installation location), per-user application data (e.g. the user's "ProgramData" folder), global application data (e.g. the global "ProgramData" folder), application binary folders (the "Program Files" folders), and operating system folders. Other possible parameters may be file type/extension (preferring document-related extensions over binary and application extensions), worldwide file uniqueness (preferring files whose meta-information checksum had not been seen before in any other organization), and file usage timestamps (preferring recently modified/created/accessed files over stale files). For each file, a grade of, for example, [0 . . . 1] is provided for each parameter. As such, a final grade of a file may be a weighted normalization of all parameters considered.

At 206, a common file between the files stored on the plurality of computing devices is identified from the metadata. As explained above, embodiments of the present disclosure enable a heuristic way of detecting duplicates by comparing file metadata (e.g., a combination of its filename, file size, and modification time). If two files have the same metadata, this heuristic duplication detection mechanism considers their data to be the same as well. Thus, if there is a wide consensus of a file's metadata, a scan and upload from one computing device 110 in which it exists and is all that may be needed, thus completely skipping scanning and uploading the common file in any other computing devices 110. In embodiments, a common file may be uploaded from one or more of computing devices 110 but less than all computing devices 110 that include the common file. For example, at 208, one of the plurality of computing devices may be selected to send a copy of the common file to central server 102 without central server 102 receiving another copy of the common file from any of the other of the plurality of computing devices. Thus, central server 102 does not instruct the other of the plurality of computing devices to send a copy of the common file to central server 102. In another embodiment, a subset of the plurality of computing devices is selected to send a copy of the common file to central server 102 without central server 102 receiving another copy of the common file from any of the other of the plurality of computing devices. Thus, central server 102 does not instruct the other of the plurality of computing devices (e.g., the computing devices not in the subset) to send a copy of the common file to central server 102. This enables rapid de-duplication of files across the plurality of computing devices during initial centralization by practically saving the time of reading all common files in most computing devices. In one embodiment, the selecting of the one or more computing devices to send a copy of the common file to central server 102 is based on performance data of each of the plurality of computing devices. For example, performance counters may be collected to estimate a maximal and average disk read throughput (along with the disk vendor and model), network bandwidth, and central processing unit (CPU) usage of each of the plurality of computing devices to determine which computing devices are best (e.g., the fastest) to upload certain files.

At 210, the plurality of computing devices are instructed to send a copy of their respective files to central server 102 in a defined order that is based on the importance level for each of the files. In one embodiment, the order of the files is determined by central server 102. In another embodiment, to keep central server 102 scalable, ranking the files by their importance can be completed at each of the plurality of computing devices instead of at central server 102. In one embodiment, a ranking of each file is based on an importance of each file as it compares with an importance level of all files from the plurality of computing devices. As such, in this embodiment, the ranking of files it based on all of the files from each of the plurality of computing devices. At 212, a copy of the files for the plurality of computing devices are stored on central server 102.

In one embodiment, upon storing the copy of the common file on central server 102, the common file on each of the other of the plurality of computing devices is scanned to determine whether the identification that the common file is stored on each of the plurality of computing devices is false. In another embodiment, a copy of the common file is taken from a subset of the plurality of computing devices and each copy of the common file is compared to the stored copy of the common file. In each example, the common files (e.g., the scanned common files or the copies of the common files from the subset) are compared to the copy of the common file stored on central server 102 ensure that a false detection of common files as not been made. If it determined that a false detection of a common file has been made, an alert is generated and the identifier (e.g., specific file name) of the falsely detected common file is added to a black-list to prevent the falsely detected common file from being considered as being stored on each of the plurality of computing devices.

With reference now to FIG. 3, an exemplary flow diagram illustrated another exemplary method for providing a mass centralization approach to full image cloning of multiple computing devices 110 will now be described. At 302, each file stored on a disk within a computing device is mapped to at least one of a plurality of blocks on the disk. In one embodiment, this is achieved by querying NTFS. At 304, for one or more of a plurality of regions on the disk, it is determined that a number of files appearing in sequential blocks exceeds a predefined threshold number of files. In one embodiment, the predefined threshold number of files is a threshold number defined by a user or a system's administrator. For example, the predefined threshold number is selected to be large enough to avoid numerous disk head jumps if the predefined threshold number of files is present on the disk in sequential order.

At 306, a continuous scan of the one or more of the plurality of regions of the disk occupied by the number of files appearing in sequential blocks exceeding the predefined threshold number of files is performed. In one embodiment, performing a continuous scan of the one or more regions of the disk occupied by the sequential blocks is performed in a single pass on the sequential blocks. At 308, a VSS snapshot, to create a point-in-time snapshot, of the files on the computing device is made to upload any remaining files that are not a part of the number of files that appear in sequential blocks that exceeds the predefined threshold number of files. In one embodiment, if it is determined that a file has been modified during the scanning of the disk, a VSS snapshot is taken to create a point-in-time snapshot of the files on the computing device that have been altered in order to upload a most recent set of files. Upon taking the VSS snapshot, the metadata of the files that have been modified are used to determine an importance level for each of the modified files to define an order in which the files are uploaded to central server 102. At 310, a copy of the files scanned from the one or more plurality of regions of the disk are sent to central server 102.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations. The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system-computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, as mentioned above, one or more embodiments of the present invention may also be provided with a virtualization infrastructure. While virtualization methods may assume that virtual machines present interfaces consistent with a particular hardware system, virtualization methods may also be used in conjunction with virtualizations that do not correspond directly to any particular hardware system. Virtualization systems in accordance with various embodiments, implemented as hosted embodiments, non-hosted embodiments or as embodiments that tend to blur distinctions between the two, are all envisioned. Furthermore, various virtualization operations may be wholly or partially implemented in hardware, or implemented with traditional virtualization or paravirtualization techniques. Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A system comprising:
   a server;
   a computing device comprising a disk for data storage, the disk including a plurality of blocks within a plurality of regions; and
   a processor programmed to:
      determine files on the disk to upload;
      map each file stored on the disk to at least one of the plurality of blocks;
      upload the files to the server using a hybrid approach, wherein the hybrid approach to uploading the files scans a plurality of files of the files to upload in order to upload the plurality of files appearing in sequential blocks and also creates a point-in-time snapshot for uploading one or more remaining files of the files to upload, the one or more remaining files being files distinct from the plurality of files scanned such that both the plurality of files are scanned and the distinct one or more remaining files are uploaded using the point-in-time snapshot, and wherein uploading the files to the server using the hybrid approach includes:
         for one or more of the plurality of regions of the disk, determining that a number of files appearing in sequential blocks exceeds a predefined threshold number of files;
         performing a continuous scan of the one or more of the plurality of regions of the disk occupied by the number of files appearing in sequential blocks exceeding the predefined threshold number of files;
         for remaining files of the files stored on the disk to upload that do not appear in the sequential blocks, creating the point-in-time snapshot of the remaining files that are not part of the one or more regions of the plurality of regions of the disk that were scanned; and
         sending a copy of the files scanned from the one or more plurality of regions of the disk and a copy of the files from the point-in-time snapshot corresponding to the one or more remaining files to the server.

2. The system of claim 1, wherein performing a continuous scan of the one or more regions of the disk occupied by the sequential blocks is performed in a single pass on the sequential blocks.

3. The system of claim 1, wherein the processor is further programmed to:
   determine which files in the one or more of the plurality of regions of the disk have been modified during the scanning; and
   re-scan each of the modified files using a static snapshot.

4. The system of claim 3, wherein re-scanning each of the modified files comprises:
   scanning for metadata in each of the modified files; and
   sending a copy of each of the scanned modified files to the server in a defined order based on the metadata.

5. The system of claim 4, wherein sending a copy of each of the scanned modified files to the server in a defined order comprises:
   determining an importance level of each of the modified files based on the metadata; and
   sending a copy of the modified files to the server in an order that is based on the importance level for each of the modified files.

6. The system of claim 1, wherein sending the copy of the files from the point-in-time snapshot includes:
   scanning each remaining file for metadata; and
   sending a copy of at least a subset of the scanned remaining files to the server in a defined order based on the metadata.

7. The system of claim 6, wherein sending a copy of at least the subset of the scanned remaining files to the server in a defined order comprises:
   determining an importance level of each file in the subset of the scanned remaining files based on the metadata; and
   sending a copy of the subset of the scanned remaining files to the server in an order that is based on the importance level of each file in the subset of the scanned remaining files.

8. A method for cloning an image of a computing device, the computing device comprising a disk that includes a plurality of blocks, the method comprising:
   determining files on the disk to upload;
   mapping each file stored on the disk to at least one of the plurality of blocks;
   uploading the files to the server using a hybrid approach, wherein the hybrid approach to uploading the files scans a plurality of files of the files to upload in order to upload the plurality of files appearing in sequential blocks and also creates a point-in-time snapshot for uploading one or more remaining files of the files to upload, the one or more remaining files being files distinct from the plurality of files scanned such that both the plurality of files are scanned and the distinct one or more remaining files are uploaded using the point-in-time snapshot, and wherein uploading the files to the server using the hybrid approach includes:

for one or more of a plurality of regions on the disk, determining that a number of files appearing in sequential blocks exceeds a predefined threshold number of files;

performing a continuous scan of the one or more of the plurality of regions of the disk occupied by the number of files appearing in sequential blocks exceeding the predefined threshold number of files;

for remaining files of the files stored on the disk to upload that do not appear in the sequential blocks, creating the point-in-time snapshot of the remaining files that are not part of the one or more regions of the plurality of regions of the disk that were scanned; and sending a copy of the files scanned from the one or more plurality of regions of the disk and a copy of the files from the point-in-time snapshot corresponding to the one or more remaining files to the server.

9. The method of claim 8, wherein performing a continuous scan of the one or more regions of the disk occupied by the sequential blocks is performed in a single pass on the sequential blocks.

10. The method of claim 8, further comprising:
determining which files in the one or more of the plurality of regions of the disk have been modified during the scanning; and
re-scan each of the modified files using a static snapshot.

11. The method of claim 8, wherein re-scanning each of the modified files comprises:
scanning for metadata in each of the modified files; and
sending a copy of each of the scanned modified files to the server in a defined order based on the metadata.

12. The method of claim 11, wherein sending a copy of each of the scanned modified files to the server in a defined order comprises:
determining an importance level of each of the modified files based on the metadata; and
sending a copy of the modified files to the server in an order that is based on the importance level for each of the modified files.

13. The method of claim 12, wherein the importance level for each of the modified files is based on one or more of the following: file location, file type/extension, file uniqueness, and file usage timestamps.

14. The method of claim 8, wherein sending the copy of the files from the point-in-time snapshot includes:
scanning each remaining file for metadata; and
sending a copy of at least a subset of the scanned remaining files to the server in a defined order based on the metadata.

15. The method of claim 14, wherein sending a copy of at least the subset of the scanned remaining files to the server in a defined order comprises:
determining an importance level of each file in the subset of the scanned remaining files based on the metadata; and
sending a copy of the subset of the scanned remaining files to the server in an order that is based on the importance level of each file in the subset of the scanned remaining files.

16. A non-transitory computer-readable medium having computer-executable instructions stored thereon for cloning an image of a computing device comprising a disk that includes a plurality of blocks, the computer-executable instructions, when executed by a processor, cause the processor to:

determine files on the disk to upload;
map each file stored on the disk to at least one of the plurality of blocks;
upload the files to the server using a hybrid approach, wherein the hybrid approach to uploading the files scans a plurality of files of the files to upload in order to upload the plurality of files appearing in sequential blocks and also creates a point-in-time snapshot for uploading one or more remaining files of the files to upload, the one or more remaining files being files distinct from the plurality of files scanned such that both the plurality of files are scanned and the distinct one or more remaining files are uploaded using the point-in-time snapshot, and wherein uploading the files to the server using the hybrid approach includes:
for one or more of a plurality of regions on the disk, determining that a number of files appearing in sequential blocks exceeds a predefined threshold number of files;
performing a continuous scan of the one or more of the plurality of regions of the disk occupied by the number of files appearing in sequential blocks exceeding the predefined threshold number of files;
for remaining files of the files stored on the disk to upload that do not appear in the sequential blocks, creating the point-in-time snapshot of the remaining files that are not part of the one or more regions of the plurality of regions of the disk that were scanned; and
sending a copy of the files scanned from the one or more plurality of regions of the disk and a copy of the files from the point-in-time snapshot corresponding to the one or more remaining files to the server.

17. The non-transitory computer-readable medium of claim 16, wherein performing a continuous scan of the one or more regions of the disk occupied by the sequential blocks is performed in a single pass on the sequential blocks.

18. The non-transitory computer-readable medium of claim 16, wherein the computer-executable instructions further cause the processor to:
determine which files in the one or more of the plurality of regions of the disk have been modified during the scanning; and
re-scan each of the modified files using a static snapshot.

19. The non-transitory computer-readable medium of claim 16, wherein rescanning each of the modified files comprises:
scanning for metadata in each of the modified files; and
sending a copy of each of the scanned modified files to the server in a defined order based on the metadata.

20. The non-transitory computer-readable medium of claim 19, wherein sending a copy of each of the scanned modified files to the server in a defined order comprises:
determining an importance level of each of the modified files based on the metadata; and
sending a copy of the modified files to the server in an order that is based on the importance level for each of the modified files.

21. A system comprising:
a server;
a computing device comprising a disk for data storage, the disk including a plurality of blocks within a plurality of regions; and
a processor programmed to:
determine files on the disk to upload;
map each file stored on the disk to at least one of the plurality of blocks;

upload the files to the server using a hybrid approach, wherein the hybrid approach to uploading the files scans one or more files of the files and creates a point-in-time snapshot for uploading one or more remaining files of the files to upload, wherein uploading the files to the server using the hybrid approach includes:

determine one or more of a plurality of regions of the disk have been modified during the upload; and re-upload each of the modified files using a static snapshot including:
    scanning for metadata in each of the modified files; and
    sending a copy of each of the scanned modified files to the server in a defined order based on the metadata wherein sending a copy of each of the scanned modified files to the server in a defined order comprises:
        determining an importance level of each of the modified files based on the metadata; and
        sending a copy of the modified files to the server in an order that is based on the importance level for each of the modified files.

\* \* \* \* \*